Figures 1, 2:
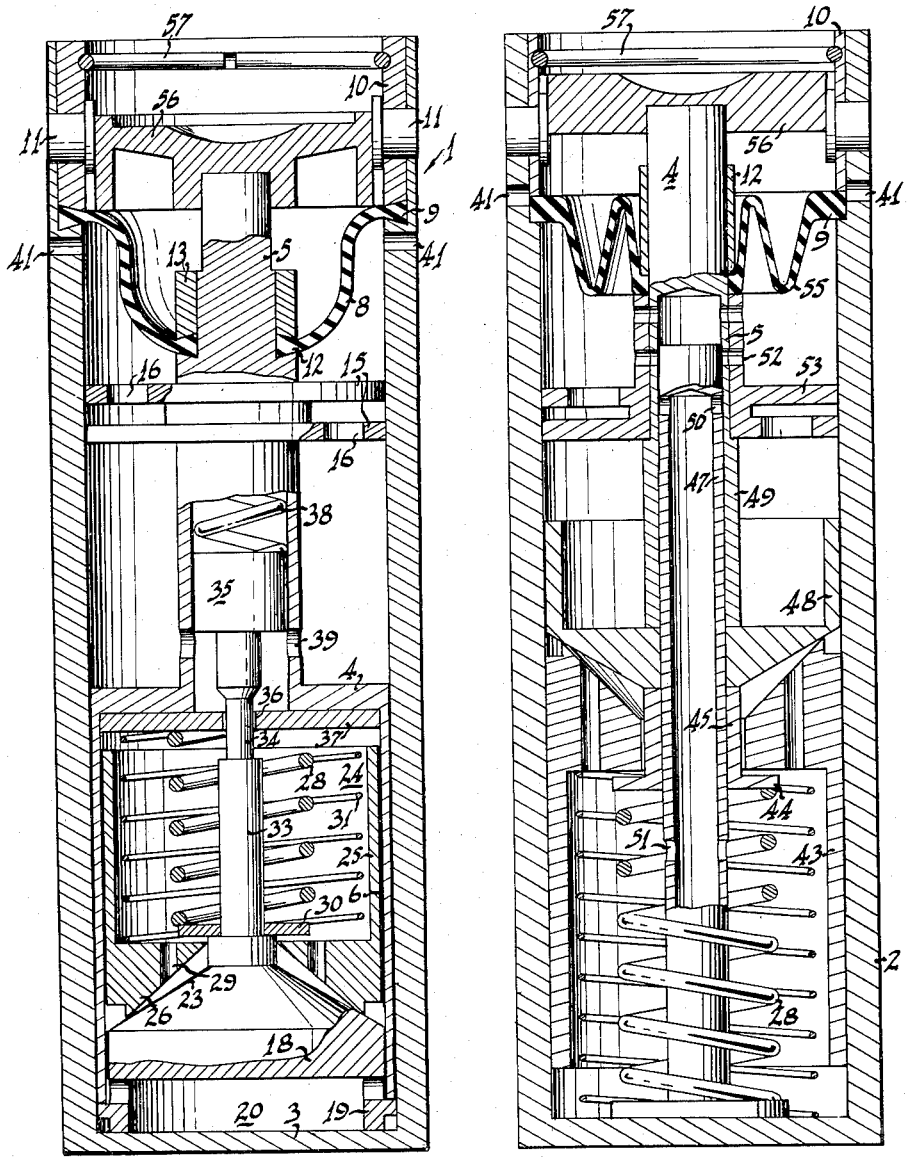

Feb. 14, 1961  D. C. WRIDE  2,971,502
SILENT CAM FOLLOWER

Filed Aug. 10, 1960  2 Sheets-Sheet 1

2,971,502
SILENT CAM FOLLOWER

Donald Charles Wride, 42 Landseer Crescent, Dernham Court, South Australia, Australia Filed Aug. 10, 1960, Ser. No. 48,659

Claims priority, application Australia Aug. 12, 1959

13 Claims. (Cl. 123—90)

This invention relates to an improved valve lifter of the hydraulic type which may be used for compensating temperature and other variables in a motor vehicle internal combustion engine.

In motor vehicle internal combustion engines, it is known that much of the noise is due to the striking of the valve stem by the rocker arm (in an overhead valve engine for example), and many efforts have been made to reduce this noise, various means having been employed previously such as using soft metal pads, hydraulic cam followers fed with pressure oil from the engine oil pump, and self contained hydraulic cam followers.

According to my United States application No. 804,791 filed on April 7, 1959, a silent cam follower comprised valve means within a closed space, and a flexible resilient seal to define, with an outer member, the closed space, the arrangement being such that the reservoir space within the closed space was always held at substantially atmospheric pressure. With this arrangement the tendency for oil to leak out or air to leak in is very much reduced, and it has been shown by a wide series of tests that the presence of air in a cam follower is the major cause of failure, and the use of the flexible seal as disclosed in the said application is effective in reducing the possibility of entry of air into a follower.

In order to prevent any possibility of the effective length of a self-contained cam follower increasing or "building up" in operation, a controlled leakage path is used whereby some oil flow passes from the pressure space within a follower into the reservoir space during the operating period, this oil being replenished in the pressure space during the recovery period. The series of tests referred to above have also disclosed that one of the other main causes of failure in cam followers is failure of the valve separating the pressure and reservoir spaces to operate under unfavourable conditions. For example, if a ball is used, the inertia of the ball becomes of great importance because of its magnitude when related to the diameter of the seat which it seals.

If on the one hand a ball is arranged to seat against a hole disposed above it, an advantage is obtained in that at the end of an operating period, the ball tends to be thrown from its seat to allow oil to pass from the reservoir space within a follower to the pressure space, so that a quick recovery is thereby obtained. However the inertia force at the commencement of an operating period also tends to remove the ball from the seat, so a substantially heavy spring is required to prevent this.

If a heavy spring is used, a very small quantity of air in the pressure space will render the valve wholly inoperative. If on the other hand the ball is arranged to seal a hole disposed beneath it, the inertia force co-operates with the spring force to urge the ball onto the hole at the end of the operating period, and pressure differential is relied upon entirely to overcome both the weight of the ball and the pressure of the spring.

There is the further danger in such a case that the ball will be lifted from its seat at the end of the upward travel of the cam follower if the engine is run at high speed.

In order to reduce these problems, and provide a valve which will operate even under unfavourable conditions of the presence of air within a follower of the enclosed type, I propose the use of a piston in lieu of a ball as the valve member. In this manner the pressure differential is effective over a very much greater area, and the relationship of mass to area becomes more favourable.

Furthermore, by use of the piston within the pressure space, the piston may be arranged to frictionally engage the cylindrical walls of the pressure space, and since the pressure space always becomes less during the operating period of the follower, and increases under spring action during the recovery period, the frictional engagement of the piston with the cylindrical walls will cause the valve to open during the recovery period.

In its simplest form the invention may be said to comprise a cam follower of the self-contained type wherein a valve divides a pressure space with cylindrical walls from a reservoir space, a piston frictionally engaging on the cylindrical walls and axially movable to open or close the valve, the frictional engagement of the piston combining with the pressure differential between the two said spaces to cause the piston to open the valve during the recovery period.

The invention is described hereunder with reference to two embodiments.

Figure 3:
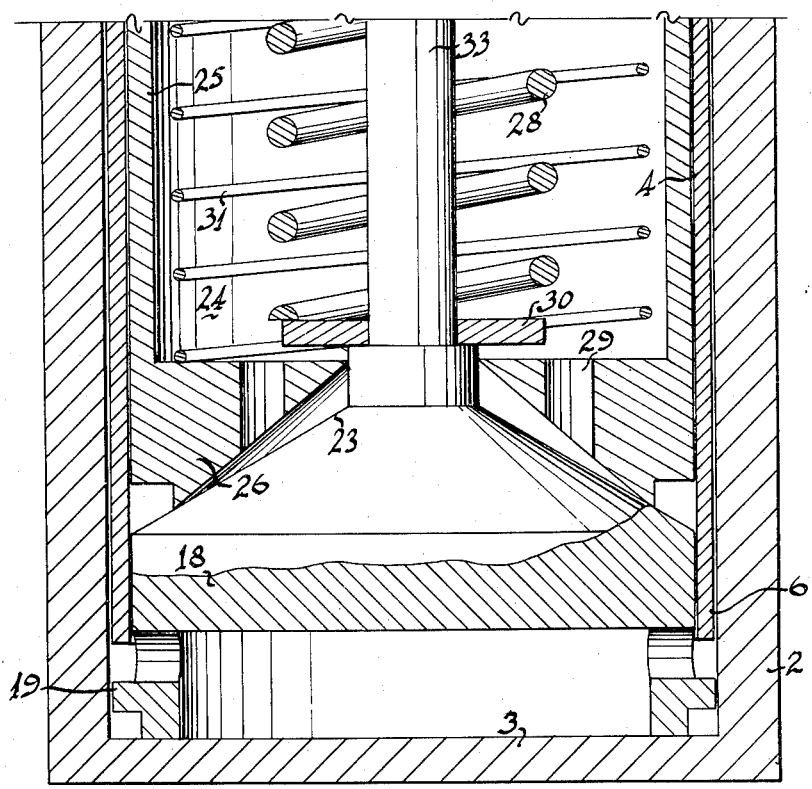

In the drawings:

Fig. 1 is a central section through a cam follower according to a first embodiment, Fig. 2 is a central section through a cam follower according to a second embodiment, and Fig. 3 is a fragmentary section of portion of Fig. 1 drawn to a somewhat enlarged scale.

In the embodiment of Figs. 1 and 3, the piston comprising the valve member is shown arranged for limited axial movement in relation to the outer member, while in the embodiment of Fig. 2 the piston is arranged for limited axial movement in relation to the inner member. Bleed means according to the embodiment of Figs. 1 and 3 comprise a poppet valve, while bleed means according to the embodiment of Fig. 2 comprise a slide valve.

Referring first to the embodiments of Figs. 1 and 3, a cam follower 1 comprises an outer tubular member 2 with its lower end 3 closed, and an inner member 4 with an upstanding spindle 5 and a lower inverted cup-shaped portion 6 disposed at the inner end of the inner member 4.

A resilient washer 8 of oil resistant synthetic rubber (such as polytetrafluorethylene) is retained around its outer periphery 9 by means of the sleeve 10 which is pressed into the open end of the outer tubular member 2 and retained therein by a pair of headed pins 11, while the inner periphery 12 of the resilient washer 8 is retained on the upstanding spindle 5 by means of the sleeve 13 which is press-fitted over the said spindle. The spindle 5 has a pair of flanges 15 which are of almost the same diameter as the bore of the tubular member 2, the flanges 15 being provided with apertures 16 which are staggered so that any oil which is to flow from above the flanges must pass in the narrow space between the flanges 15, thereby tending to attenuate any air bubbles, and it is found that the use of these flanges or other similar baffles is effective in preventing the passage of air to a marked degree.

The lower end of the outer tubular member 2 has an upstanding spigot 18 resting within it. The upstanding spigot 18 has a short out-turned flange 19 which acts as stop means for the cup-shaped portion 6 of the inner member 4 when the inner member 4 is urged inwardly to its extreme position as shown in Fig. 1.

This out-turned flange 19 also serves to align the spigot 18 with the bore of the outer tubular member 2 to some extent, although in this embodiment there is a radial clearance of approximately 0.010 inch between the out-turned flange and the bore of the outer tubular member, so that the spigot 18 is floating.

The spigot 18 has a central opening 20 communicating with the space above the flange 19 by means of the apertures 21, and this central opening 20, together with the space beneath the flange 19 comprises a sediment trap so that particles of unwanted solid matter may settle at this locality and will not tend to readily enter the flow of oil which exists during operation of the follower.

The upper face 23 of the spigot 18 is tapered, in this embodiment with an included angle of sixty degrees, and is machined to a very smooth finish and hardened since it constitutes a valve face.

A piston 24 is provided with an upstanding skirt 25 and a valve end 26. This valve end 26 is machined with an included angle of ninety degrees and also hardened so that the piston is to some extent self-centering on the upper face 23 of the spigot 18. The space above the piston 24 and within the cup-shaped portion 6 of the inner member 4 comprises the pressure space of the follower, while the space outside the cup-shaped portion 6 comprises the reservoir space.

When the cam follower is passing through its operating period, the inner member 4 is urged inwardly into the outer tubular member 2, and a relative movement exists between the cup-shaped portion 6 and the piston 24, the oil within the pressure space being urged outwardly at a very limited rate between the skirt 25 of the piston 24 and the inner surface of the cup-shaped portion 6, the radial gap in this embodiment being between the limits of 0.0002 and 0.0005 inch. This is however sufficient to ensure a slight inward movement during the operating period and thereby prevent the tendency for the inner member to gradually work outwardly from the outer member during operation.

Since the gap between the skirt 25 and the cup-shaped portion 6 is small, and in any case is completely filled with oil, it will be seen that a frictional engagement exists between the skirt 25 and the cup-shaped portion 6, so that when the cup-shaped portion 6 of the inner member 4 is urged outwardly from the outer tubular member 2 by the recovery spring 28 during the recovery period, the frictional engagement lifts the valve end 26 of the piston away from the upper face 23 of the spigot 18, and in any case this motion is assisted by the differential of pressure in the pressure space and the reservoir space, a sub-atmospheric pressure being induced in the pressure space by the action of the recovery spring 28.

The apertures 29 in the valve end 26 of the piston ensure that the oil can readily flow and prevents adhesion between the valve surfaces from becoming an important factor. The upward movement of the piston 24 is limited by the washer 30 to approximately 0.004 inch, and the light spring 31 moves a piston return spring and has the effect of comparatively slowly returning the piston to seal on the upper face 23 before the next operating period of the follower commences, thereby ensuring a minimum of lost motion within the follower.

The spigot 18 has an upwardly extending stem 33, and this stem is of such length that it engages the downward extension 34 of the plunger 35 which is slidable in the spindle 5 of the inner member 4, the plunger 35 normally seating to close the aperture 36 in a washer 37 disposed in the upper end of the cup-shaped portion 6, the plunger 35 being urged downwardly by the plunger spring 38, and the plunger 35 normally closing the transverse hole 39 in the spindle 5.

This arrangement works as a bleed means when the cam follower is collapsed as shown in Fig. 1, whereby the contents of the pressure space may readily bleed out to the reservoir space, so that if air should be mixed with the oil within the pressure space and the cam follower put into operation, the cam follower becomes resilient to compress the air in the pressure space and allow the follower to collapse, whereupon the air, which moves rapidly through the oil, is quickly discharged through the aperture 36 and the transverse holes 39. This arrangement also assists in charging the follower with oil, since the oil can be passed through one of the charging apertures 41 and is free to flow directly into the pressure space, the pressure space very quickly filling if the follower is "pumped" while charging. After charging the apertures 41 are closed with plugs.

It is desirable that the oil chosen to fill the follower should be of the non-sticky type (that is of the type which is not cohesive) and preferably is of a viscosity less than ten S.A.E. The most suitable oil which has yet been tested is sold by the Dow Chemical Company of Michigan, U.S.A. as "Silicone 200."

A consideration of the above embodiment will show that the bleeding arrangement is very rapid in its operation since there can be a considerable flow through the aperture 36 and the transverse hole 39, it will be seen that the manufacturing costs involved in introducing the bleeding arrangement are not great, furthermore it will be seen that there is no leakage path past the bleeder since the plunger 35 can effectively seal the aperture 36 under the action of the spring 38, and due to the large surface area around the valve seat, there is no "wire drawing" of bleed oil flow.

It has been found that the use of fine oil, such as the quoted "Silicone 200," prevents a passage of oil film past the valve seat, and it has been found that this passage of oil film past the valve seat is one of the factors which tends to allow lost motion in the cam follower during operating period.

The floating spigot 18 permits the valve seat 23 to come under the influence of the valve end 26 of the piston 24, and this permits wider manufacturing tolerances while still ensuring a good seal on the valve seat. The gap between the cup-shaped portion 6 of the inner member and the outer tubular member 2 is kept substantially small, in the above embodiment the radial gap being made approximately 0.025 inch, and this has the further effect of attenuating any air bubbles which tend to be drawn downwardly between the cup-shaped portion and the outer tubular member, so that such air bubbles tend to remain within the reservoir space and do not enter the pressure space readily.

Fig. 2 illustrates a variation of the above embodiment, the main difference being that in this case the piston comprises the member 43, and is retained to the inner member 4 for limited relative axial movement in relation thereto by means of the flange 44 on the spacer member 45 which is urged upwardly by the recovery spring 28.

A hollow stem 47 extends upwardly through the spacer member 45, through the cup-shaped portion 48 which in this embodiment is inverted in relation to the cup-shaped portion 6 of the embodiment of Figs. 1 and 3, and through the spindle 49 of the inner member 4, the hollow stem 47 being provided with two transverse holes, the upper transverse hole 50 normally being inoperative, and the lower transverse hole 51 normally lying within the pressure space below the piston 43, but upon collapse of the follower, the upper hole 50 aligns with the transverse hole 52 in the spindle 5 and the baffle member 53 to permit the passage of bleed oil from the pressure space to the reservoir space and above the baffle member 53, thus ensuring a rapid bleeding of air from the pressure space to the reservoir space.

The flexible seal 55 is arranged for more flexibility than the seal illustrated in Fig. 1. and again is retained to the spindle 5 by the sleeve 12 press-fitted thereonto, but in this embodiment the charging apertures 41 are disposed above the flexible seal 55, and the follower is charged with oil while the flexible seal 55 is distorted from its normal position.

After the follower has been charged with oil, the sleeve 10 is positioned and forces the outer peripheral edge 9 of the flexible seal 55 past the charging apertures 41, thus enabling the charging to be achieved without the need for plugs.

The operation of this follower is identical to that of the follower illustrated in Figs. 1 and 3, apart from the variations which have been mentioned above.

In both cases the inner member 4 is provided with a push-rod engaging member 56, the outward movement of which is limited by the spring wire clip 57, the push rod engaging member 56 being slotted to engage the headed pins 11, thereby preventing rotation of the member 56, and the inner member 4 to which it is attached. By this means damage to the seal is reduced.

Fig. 2 illustrates an extended piston 43, which will bottom in the outer member 2 so that any foreign matter on the valve faces will be crushed by the main valve spring of the engine upon complete collapse of the follower.

What I claim is:

1. A cam follower for an internal combustion engine comprising an outer tubular member, an inner member movable in an axial direction within the outer tubular member, a pressure space comprising cylindrical walls and divided from a reservoir space within the outer tubular member by a valve, a piston frictionally engaging said cylindrical walls and axially movable to open or close said valve, a leakage path for restricted liquid flow from the pressure space to the reservoir space during the operating period of the follower, and spring means to urge said inner member in an outward direction from said outer member during the recovery period of the follower, characterised in that the frictional engagement of the piston opens said valve during the recovery period.

2. A cam follower for an internal combustion engine comprising an outer tubular member, an inner member movable in an axial direction within the outer tubular member, a pressure space comprising cylindrical walls and divided from a reservoir space within the outer tubular member by a valve, oil in said pressure space and said reservoir space, a piston frictionally engaging said cylindrical walls, said piston being movable in a first axial direction by oil in said pressure space to close said valve during the operating period of the follower, a leakage path for restricted liquid flow from the pressure space to the reservoir space during the operating period of the follower, and spring means to urge said inner member in an outward direction from said outer member during the recovery period of the follower, said piston being movable in a second axial direction to open said valve during the recovery period.

3. A cam follower for an internal combustion engine comprising an outer tubular member, an inner member movable in an axial direction within the outer tubular member, a pressure space comprising cylindrical walls and divided from a reservoir space within the outer tubular member by a valve, a piston frictionally engaging said cylindrical walls and axially movable to open or close said valve, a leakage path for restricted liquid flow from the pressure space to the reservoir space during the operating period of the follower, and spring means to urge said inner member in an outward direction from said outer member during the recovery period of the follower, characterised in that the frictional engagement of the piston and the pressure differential between the pressure space and reservoir space combine to open said valve during the recovery period.

4. A cam follower for an internal combustion engine comprising an outer tubular member, an inner member movable in an axial direction within the outer tubular member, a pressure space comprising cylindrical walls and divided from a reservoir space within the outer tubular member by a valve, a piston frictionally engaging said cylindrical walls and axially movable to open or close said valve, a leakage path for restricted liquid flow from the pressure space to the reservoir space during the operating period of the follower, spring means to urge said inner member in an outward direction from said outer member during the recovery period of the follower, the frictional engagement of the piston being operable to open said valve upon outward movement of said inner member during the recovery period, and bleed means operable upon collapse of the follower to provide a bleed path from the pressure space to the reservoir space.

5. A cam follower for an internal combustion engine comprising an outer tubular member, an inner member movable in an axial direction within the outer tubular member, a pressure space comprising cylindrical walls and divided from a reservoir space within the outer tubular member by a valve, oil in said pressure space and said reservoir space, a piston frictionally engaging said cylindrical walls and axially movable to open or close said valve, a leakage path for restricted liquid flow from the pressure space to the reservoir space during the operating period of the follower, and spring means to urge said inner member in an outward direction from said outer member during the recovery period of the follower, the frictional engagement of the piston being operable to open said valve upon outward movement of said inner member during the recovery period, and means on the outer member co-operating with means on the inner member to provide a bleed path from the pressure space to the reservoir space upon collapse of the follower.

6. A cam follower for an internal combustion engine comprising an outer tubular member, an inner member movable in an axial direction within the outer tubular member, a pressure space comprising cylindrical walls and divided from a reservoir space within the outer tubular member by a valve, a piston frictionally engaging said cylindrical walls and axially movable to open or close said valve, a leakage path for restricted liquid flow from the pressure space to the reservoir space during the operating period of the follower, and spring means to urge said inner member in an outward direction from said outer member during the recovery period of the follower, the frictional engagement of the piston being operable to open said valve during the recovery period, and means on the outer member to displace a plunger from a seat on the inner member to thereby provide a bleed path from the pressure space to the reservoir space upon collapse of the follower.

7. A cam follower for an internal combustion engine comprising an outer tubular member with one end closed, an inner member movable in an axial direction within said outer tubular member, a cup like portion on the inner end of said inner member, a spindle on said inner member, a seal between said spindle and said outer tubular member, a piston comprising a valve member slidable in said cup like portion and co-operating with a valve face on said outer tubular member, a leakage path for restricted outward flow of liquid from the space between said piston and said cup like portion when said piston is closed on said valve face, a flow path between said piston and said valve face for substantially unrestricted inward flow of liquid into said space when said piston is displaced from said valve face, and spring means between said inner and said outer member to urge said inner member outwardly from said outer member.

8. A cam follower for an internal combustion engine comprising an outer tubular member with one end closed, an inner member movable in an axial direction within said outer tubular member, a spindle on said inner member, a seal between said spindle and said outer tubular member to define, with the outer tubular member, a closed space, liquid in said closed space, a piston comprising a cylindrical skirt with a valve portion at one end, said piston co-operating with a valve face within said closed space to divide said closed space into a reservoir space and a pressure space, a leakage path for restricted liquid flow from the pressure space past the skirt of said piston to the reservoir space when said piston is closed on said valve face, a flow path between said piston and said valve face for substantially unrestricted flow of liquid from said reservoir space to said pressure space when the piston is displaced from said valve face, and spring means between said inner and said outer member to urge said inner member outwardly from said outer member.

9. A cam follower for an internal combustion engine comprising an outer tubular member with one end closed, an inner member in the outer tubular member, guides between the inner and the outer member to prevent rotational movement but permit axial movement of said inner member within said outer tubular member, an annular flexible seal sealably retained around its outer periphery to said tubular member and sealably retained around its inner periphery to a spindle on said inner member, oil filling the space between the outer tubular member and the seal, oil charging apertures in the walls of said outer tubular member disposed above the outer periphery of said seal, a cup like portion on the inner end of said inner member, an oil flow clearance between said cup like portion and said outer tubular member, a valve face on said outer tubular member, a piston within said cup like portion frictionally engaging said cup like portion, an oil flow leakage path between said piston and said cup like portion, a valve face on said piston co-operating with said valve face on said outer member to divide the space within said outer tubular member into a pressure space within the cup like portion and a reservoir space without said cup like portion, a recovery spring urging said inner member in a direction outwardly from said outer tubular member, and means to open a bleed path for oil flow from the pressure area to the reservoir area upon collapse of said follower.

10. A cam follower for an internal combustion engine comprising an outer tubular member with one end closed, an inner member in the outer tubular member, guides on the outer member to prevent rotational movement but permit axial movement of said inner member within said outer tubular member, an annular flexible seal sealably retained around its outer periphery to said tubular member and sealably retained around its inner periphery to a spindle on said inner member, oil filling the space between the outer tubular member and the seal, a cup like portion on the inner end of said inner member, an oil flow clearance between said cup like portion and said outer tubular member, a valve face on said outer tubular member, a piston within said cup like portion frictionally engaging said cup like portion, an oil flow leakage path between said piston and said cup like portion, a valve face on said piston co-operating with said valve face on said outer member to divide the space within said outer tubular member into a pressure space within the cup like portion and a reservoir space without said cup like portion, a recovery spring to urge said inner member outwardly from said outer tubular member, a piston return spring to urge the valve face of said piston into contact with the valve face of said outer tubular member, and means to open a bleed path for oil flow from the pressure area to the reservoir area upon collapse of said cam follower.

11. A cam follower for an internal combustion engine comprising an outer tubular member with one end closed, an inner member in the outer tubular member, guides on the outer member to prevent rotational movement but permit axial movement of said inner member within said outer tubular member, an annular flexible seal sealably retained around its outer periphery to said tubular member and sealably retained around its inner periphery to a spindle on said inner member, oil filling the space between the outer tubular member and the seal, apertured baffle flanges on said spindle disposed inwardly from said seal, a cup like portion on the inner end of said seal, an oil flow clearance of less than 0.040 inch between said cup like portion and said outer tubular member, a valve face on said outer tubular member, a piston within said cup like portion frictionally engaging said cup like portion, an oil flow leakage path between said piston and said cup like portion, a valve face on said piston co-operating with said valve face on said outer member to divide the space within said outer tubular member into a pressure space within the cup like portion and a reservoir space without said cup like portion, a recovery spring to urge said inner member outwardly from said outer tubular member, and means to open a bleed path for oil flow from the pressure area to the reservoir area upon collapse of said cam follower.

12. A cam follower for an internal combustion engine comprising an outer tubular member with one end closed, an inner member in the outer tubular member, guides on the outer member to prevent rotational movement but permit axial movement of said inner member within said outer tubular member, an annular flexible seal sealably retained around its outer periphery to said tubular member and sealably retained around its inner periphery to a spindle on said inner member, oil filling the space between the outer tubular member and the seal, apertured baffle flanges on said spindle disposed inwardly from said seal, a cup like portion on the inner end of said seal, an oil flow clearance between said cup like portion and said outer tubular member, a floating spigot in the inner end of said outer tubular member, a sediment trap around and beneath said spigot, a tapered valve face on said spigot, a piston within said cup like portion frictionally engaging said cup like portion, an oil flow leakage path between said piston and said cup like portion, a tapered valve face on said piston co-operating with said valve face on said spigot to divide the space within said outer tubular member into a pressure space within the cup like portion and a reservoir space without said cup like portion, means to limit axial displacement of the piston from the spigot, a recovery spring to urge said inner member outwardly from said outer tubular member, a piston return spring to urge the valve face of said piston into contact with said spigot, and means to open a bleed path for oil flow from the pressure area to the reservoir area upon collapse of said cam follower.

13. A cam follower for an internal combustion engine comprising an outer tubular member with one end closed, an inner member in the outer tubular member, guides on the outer member to prevent rotational movement but permit axial movement of said inner member within said outer tubular member, an annular flexible seal sealably retained around its outer periphery to said tubular member and sealably retained around its inner periphery to a spindle on said inner member, oil filling the space between the outer tubular member and the seal, oil charging apertures in the walls of said outer tubular member disposed above the outer periphery of said seal, apertured baffle flanges on said spindle disposed inwardly from said seal, a cup like portion on the inner end of said seal, an oil flow clearance between said cup like portion and said outer tubular member, a floating spigot in the inner end of said outer tubular member, a sediment trap around and beneath said spigot, a tapered valve face on said spigot, a piston within said cup like portion frictionally engaging said cup like portion, an oil flow leakage path between said piston and said cup like portion, a tapered valve face on said piston co-operating with said valve face on said spigot to divide the space within said outer tubular member into a pressure space within the cup like portion and a reservoir space without said cup like portion, means to limit axial displacement of the piston from the spigot, a recovery spring to urge said inner member outwardly from said outer tubular member, a piston return spring to urge the valve face of said piston into contact with said spigot, and a stem on said spigot arranged to displace a plunger from a seat in said cup like portion for bleed purposes upon collapse of said cam follower.

No references cited.